Sept. 9, 1958 M. F. THOMPSON 2,851,616

CURRENT LIMITED MAGNETIC PULSE GENERATOR

Filed Dec. 27, 1955

*INVENTOR.*
MALCOLM F. THOMPSON

BY William R Lane

ATTORNEY

United States Patent Office 2,851,616
Patented Sept. 9, 1958

2,851,616

CURRENT LIMITED MAGNETIC PULSE GENERATOR

Malcolm F. Thompson, Bellflower, Calif., assignor to North American Aviation, Inc.

Application December 27, 1955, Serial No. 555,692

10 Claims. (Cl. 307—106)

This invention pertains to an improved magnetic pulse generator and, in particular, to a magnetic pulse generator of pulses of radio frequency such as used for driving a magnetron, klystron, or other radio frequency generator.

Pulse generators used to drive radio frequency generators and radar transmitters customarily comprise electron tubes and, in particular, gas tubes used as rapidly-acting switching devices. These tubes inherently have poor reliability and short life. This invention contemplates a device overcoming the disadvantages of conventional pulse generators using a more efficient and reliable switching mechanism and requiring a minimum of external voltage sources. Saturable elements are used as switching devices to transfer charges to successive capacitors, decreasing the width of the pulse upon each transfer.

It is desirable in the last stage of the pulse generator that some means be provided for limiting the output current in order to prevent excessive current flow in the load. If, for example, the load is a magnetron, arcing will occur if the current is not controlled. It is difficult to provide control for such output circuit at the high frequencies encountered. The device of the invention is a circuit particularly adapted to control and function as an integral part of the magnetic pulse generator.

It is therefore an object of this invention to provide an improved magnetic pulse generator.

It is another object of this invention to provide a current limited magnetic pulse generator.

A further object of this invention is to provide a pulse generator having a controlled output peak current.

It is still another object of this invention to provide a current limiting device in the output of a high frequency magnetic pulse generator.

A further object of this invention is to provide a saturable reactor for limiting the current of the output stage of a magnetic pulse generator.

Figure 1:
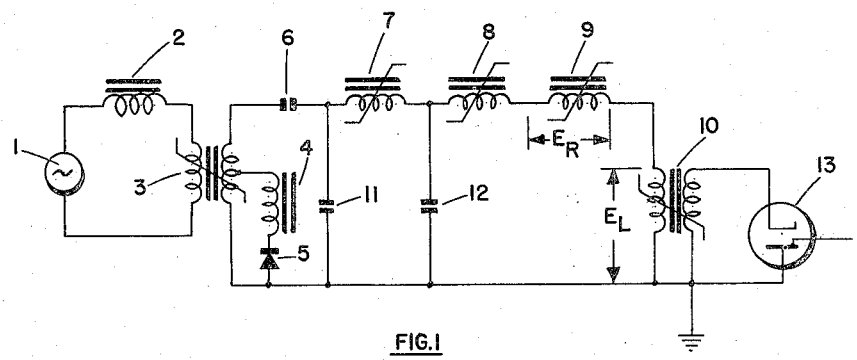
Figure 2:
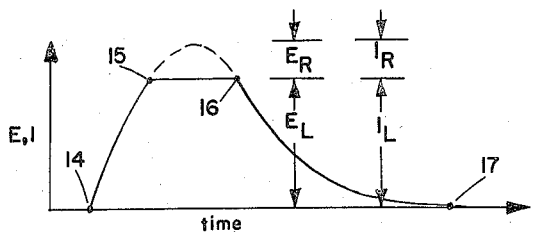
Figure 3:
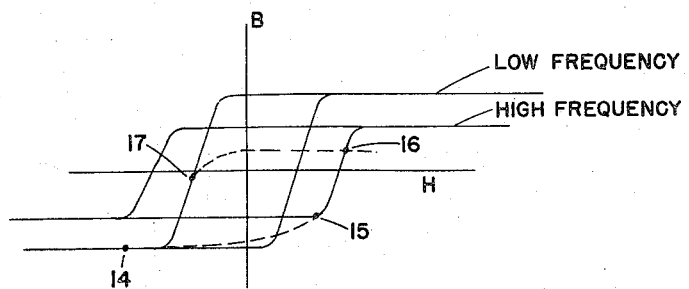

Other objects of invention will become apparent from the following description taken in connection with the accompanying drawings, in which Fig. 1 is a circuit diagram of the magnetic pulse modulator using the device of the invention;

Fig. 2 is a graph showing an output voltage pulse or current pulse;

And Fig. 3 illustrates the high frequency and low frequency hysteresis loops of magnetic core material.

In Fig. 1, alternating voltage supply 1 is of desired A. C. frequency. Iron core inductor 2 is provided to form a series resonant circuit at the A. C. frequency with the capacitive reactance reflected across saturable transformer 3. A portion of the secondary of saturable transformer 3 is connected in a closed circuit consisting of magnetic inductance 4 and diode 5 which provides a circulating D. C. current to bias saturable transformer 3 in a particular direction. Capacitance 6 is the capacitive reactance reflected through transformer 3. As a half-cycle appears at generator 1, transformer 3 first acts as a transformer providing a high voltage on the secondary side. This is a relatively slow rise in voltage and, therefore, saturable reactors 7, 8 and 9 and saturable transformer 10 act as short circuits and substantially the full voltage of transformer 3 appears across capacitor 6. As transformer 3 saturates, caused by source 1 and aided by the D. C. biasing current flowing in diode 5 and inductor 4, the secondary of transformer 3 becomes, in effect, a very low inductance, and the charge on capacitor 6 is transferred to capacitor 11. At this point, saturable reactor 7 begins to absorb volt-seconds in the opposite direction from its previous state, and, as it reaches saturation, it, too, acts as a very low inductance. This saturated inductance, together with the capacitance of capacitors 11 and 12, determines the width of the pulse charging capacitor 12. As the charge reaches capacitor 12, saturable reactor 8 then commences absorbing volt-seconds and, as it reaches saturation, it acts as a very low inductance, and the voltage of capacitor 12 is expressed across current limiting reactor 9 (inserted to control the amount of current flow) and saturable transformer 10 which transfers the power output of the circuit to magnetron 13. It will be noted that capacitor 6, together with the secondary of transformer 3, reactor 7, together with capacitor 11, and saturable reactor 8, together with capacitor 12, are all L sections and are connected together in cascade. The successive L sections, of which there may be more than merely two or three, as shown, act to narrow the pulse width of the charge placed on capacitor 6. Each succeeding capacitor is, then, charged by a narrower pulse than the pulse charging the preceding capacitor. The width of the voltage pulse appearing across successive capacitors depends on the small quantity of inductance remaining in each reactor when saturated and the capacitor values.

Fig. 2 is an illustration of current and voltage vs. time, showing how the voltage and current across the load would ordinarily build up to a peak value (shown by the dotted lines) with no current limiting inductor 9 in the circuit. The output circuit consisting of capacitor 12, saturable reactor 8 and transformer 10, together with magnetron 13, is, ordinarily, tuned close to critical damping. Therefore, the waveform shown in Fig. 2 reaches a peak rather than a more desirable flat-top type wave. It is desirable that the maximum voltage be as illustrated in Fig. 2 as $E_L$, and that the remainder of the voltage, $E_R$, be expressed across saturable reactor 9, Fig. 1. This limits the current output to a maximum flat-top value indicated as $I_L$. Fig. 2 represents a resistive load situation in which current and voltage are in phase, with little or no reactive voltage. If the load is reactive, current limiting will still occur as shown in Fig. 2.

Magnetron 13 loads down the secondary winding of pulse transformer 10 providing a load on the output circuit of the cascaded L sections. As the magnetron starts to oscillate, its impedance drops abruptly. Such drop in impedance does not harm the operation of the saturable reactors of the device in contrast with the possible burning out of gas tubes of previous devices. The saturable reactors, acting alternately as high impedance and low impedance devices, effectively isolate the load from the power source 1.

Saturable reactor 9 must bear a definite relation to saturable reactor 8 in the device of the invention. Referring to Fig. 3, the hysteresis loops, or BH curves of reactor 9 are illustrated for both low and high frequencies. It can be seen that the hysteresis loop, at higher frequencies, is wider. It is that property which is used to provide current limiting action in the output of the pulse generator. As capacitor 6 is charged at a relatively low frequency, saturable reactor 9, as described previously, together with reactors 7 and 8 and saturable transformer 10, saturate relatively easily at the charging frequency which is low. Reactor 9 saturates and remains at point 14, for example. As the charge transfers first from capacitor 6 to capacitor 11 and then to capacitor 12, capacitor 12 discharges at a high frequency. Saturable reactor 8 first saturates, then saturable reactor 9 commences to move along the dotted line and the high frequency hysteresis loop to a point illustrated at 15. Between points 15 and 16, core 9 is absorbing volt-seconds and current flow does not increase. Points 15 and 16 are also labeled on Fig. 2. Core 9 does not saturate but proceeds to point 17 in its hysteresis loop. By virtue of this fact, a certain amount of the output voltage of capacitor 12 ($E_R$, Fig. 2) is expressed across reactor 9. This causes a definite limiting of the current which flows through the output load causing the flat peak of output voltage and current illustrated in Fig. 2. If the output load is not entirely resistive but is reactive, the voltage peak may be slightly distorted from that shown in Fig. 2. However, the current would still be limited effectively. As the next charge pulse is received to charge capacitor 6 again, saturable reactor 9 moves from point 17 to point 14 on the low frequency hysteresis loop.

It is noted then that saturable reactor 9 is designed not to saturate under normal pulse discharge current as does reactor 8 and it is this feature that limits the current flow in pulse transformer 10. At the charge frequency of capacitor 6 (the frequency of power source 1) reactor 9 is designed to saturate quickly, together with reactors 7 and 8 and transformer 10. At the pulse discharge of frequency of capacitor 12, reactor 8 is designed to saturate, but reactor 9, having a wider hysteresis loop, does not saturate. Reactor cores are made often of nickel-iron alloys. These cores have relatively low losses (narrow hysteresis loops), and are described as requiring low coercive forces. The wider hysteresis loop cores are, for example, silicon steel alloys. Suitable design for any particular case depends on core materials, voltages involved, charge and discharge times involved, and various other factors such as load, etc. However, it may be stated that the voltage, $E_R$, to be absorbed across the reactor is a function of cross section area A, turns N, maximum magnetic field B, and the time width of the discharge pulse T, as follows:

$$E_R = 2\frac{NAB}{T} \times 10^{-8} \text{ volts} \quad (1)$$

If a particular voltage is selected and an approximate size of area A and turns N, the equation may be solved for B to choose a suitable core material:

$$B = \frac{E_R T}{2NA} \times 10^{-8} \text{ maximum magnetic induction} \quad (2)$$

In practice, the NA figure of core 8 will be approximately ten or more times that of core 9. The time T may be well within the microsecond range.

With a controlled pulse, greater peak power can be obtained without the danger of causing arcing in the load or breakdown. It appears that such limiting device would render the ordinary modulators suitable for use in pulsing klystrons which require controlled pulses. Approximately 50% higher peak power can be obtained before the arc point is reached. Inasmuch as the current peak is not so high, the time width of the current pulse can be made much greater.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a pulse forming network, an L section comprised of a first saturable reactor and a capacitor, means for limiting the output current of said network comprising a second output saturable reactor connected in series with the output of said L section, said second output saturable reactor having a wider hysteresis loop than the core of said first saturable reactor whereby said output saturable reactor remains unsaturated under pulse discharge current.

2. The combination recited in claim 1 wherein is included a load connected to receive the output of said network, and wherein said L section, said output saturable reactor and said load are tuned to critical damping at the pulse output frequency.

3. In a pulse forming network, a plurality of L sections each comprising a saturable reactor and a capacitor, said L sections connected in cascade, means for limiting the output current of said network comprising an output saturable reactor connected in series with the output of said cascaded L sections, the core of said output saturable reactor having a wider hysteresis loop at pulse frequency than the core of the preceding saturable reactor in said cascade whereby said output saturable reactor remains unsaturated under pulse discharge current.

4. The combination recited in claim 3 wherein said capacitors in said cascaded L sections are connected in shunt and said saturable reactors in said cascaded L sections are connected in series.

5. In a pulse forming network, a plurality of L sections each comprising a saturable reactor and a capacitor, said L sections connected in cascade, means for limiting the output current of said network comprising an output saturable reactor connected in series with the output of said cascaded L sections, the core of said output saturable reactor having a comparable hysteresis loop with the preceding saturable reactor at the lower charging frequency of the capacitor of the first of said L sections, and said output saturable reactor having a wider hysteresis loop at the higher discharging frequency of the capacitor of the last of said L sections whereby said output saturable reactor remains unsaturated under pulse discharge current.

6. In a pulse generating network having means for limiting the output current of said network, an A.-C. source, a series tuned circuit comprising a capacitor and an inductor connected to said A.-C. source, a plurality of cascaded L sections each comprising a saturable reactor and a capacitor, said L sections connected to receive the output across the capacitor of said series tuned circuit, said output current limiting means comprising an output saturable reactor connected in series with the output of said cascaded L sections, the core of said output saturable reactor having a wider hysteresis loop than the core of the immediately preceding saturable reactor in said cascade whereby said output saturable reactor remains unsaturated under pulse discharge current.

7. The combination recited in claim 6 wherein is included a load circuit connected to receive the output of said output saturable reactor and said cascade sections, and wherein said load, said output saturable reactor and the L section immediately preceding said output saturable reactor are tuned to critical damping at the pulse frequency output to said load.

8. In a pulse generating network having means for limiting the output current of said network, an A.-C. source, an inductor, a saturable transformer whose primary is connected to receive the output from said A.-C. source and said inductor, means for D.-C. biasing said saturable transformer, a capacitor connected in series with the secondary of said saturable transformer, a plurality of L sections connected in cascade, each of said L sections comprising a capacitor and an inductor, the first of said L sections connected to receive the output of said series capacitor and the secondary of said saturable transformer, said output current limiting means comprising an output saturable reactor connected in series with the output of said cascaded L sections, the hysteresis loop of the core of said output saturable reactor being wider than the hysteresis loop of the case of the saturable reactor immediately preceding it whereby said output saturable reactor remains unsaturated under pulse discharge current.

9. The combination recited in claim 8 wherein is included an output saturable transformer connected to receive the output of said cascaded L sections through said output saturable reactor.

10. The combination recited in claim 8 wherein is included an output saturable transformer connected to receive the output of said cascaded L sections through said output saturable reactor, and wherein is included a load connected to the output of said saturable transformer and said output saturable reactor, said load, said output saturable transformer, and the L section immediately preceding said output saturable reactor are tuned to critical damping.

References Cited in the file of this patent

FOREIGN PATENTS 666,574     Great Britain _____ Feb. 13, 1952